3,418,347
TITANIUM OXIDE COMPOUNDS
Leon Levene, Toledo, Ohio, assignor to Owens-Illinois, Inc., a corporation of Ohio
No Drawing. Filed Oct. 12, 1965, Ser. No. 495,344
11 Claims. (Cl. 260—429.5)

ABSTRACT OF THE DISCLOSURE

Titanium oxide compounds are prepared having the general formula $(RO)_2$—TiO where the R radicals are preferably the same but can be different. Typical compounds are bis(tetradecanoxy)titanium oxide, bis(p-chlorophenoxy)titanium oxide, o-methylphenoxy-p-dodecylphenoxytitanium oxide and bis(tribenzylsiloxy) titanium oxide. The mixed titanium oxides such as o-methylphenoxy-p-dodecyclphenoxytitanium oxide are prepared by reacting the lower alkoxytitanium with the hydroxyl-containing compound or alcohol, distilling a mole of the lower aliphatic alcohol by-product formed, reacting the resultant compound with a second alcohol, distilling off another mole of the lower aliphatic alcohol by-product formed, and hydrolizing the product with an aqueous alcohol solution to form the mixed titanium oxide. The titanium oxides are used as coating agents for glass and other surfaces such as paper to impart lubricity and scratch resistance thereto.

---

The present invention pertains to novel organotitanium oxide monomers and to a method for preparing said titanium monomers. More particularly, the invention relates to compounds of the general formulae (R'O)(R"O)TiO and $(RO)_2TiO$, and, to the preparation of these titanium monomers by the deactivation of substituents attached to the titanium atom of ortho aliphatic titanium compounds.

It is an object of the present invention to provide novel titanium monomers of the structure $(RO)_2TiO$ and (R'O)(R"O)TiO. It is a further object of the invention to provide an improved method of preparing these titanium monomers. This, and other objects, will become apparent from the following description of the invention.

The new titanium compounds of this invention have the general structural formula:

$$RO-\underset{\underset{O}{\|}}{Ti}-OR$$

wherein R may be the same or different. When the R substituents are the same, the homogeneous titanium oxide has the structural formula $(RO)_2TiO$; when the R substituents are different, the heterogeneous titanium oxide has the structural formula (R'O)(R"O)TiO. The R substituents for the homogeneous and the heterogeneous titanium oxide can be defined as a member selected from the group consisting of long chain alkyl radicals of from 10 to 20 carbon atoms, an alkylphenyl radical wherein said alkyl group is from 1 to 20 carbon atoms, a halophenyl wherein said halogen is selected from the group consisting of fluorine, bromine and chlorine, an alkoxyphenyl wherein said alkoxy radical affixed to the phenyl ring is from 1 to 8 carbon atoms and wherein R may also be —Si(R$_1$)$_3$, wherein said R$_1$ is the same or different and is selected from the group consisting of phenyl, an alkylphenyl wherein said alkyl radical contains from 1 to 10 carbon atoms, a phenylalkylene wherein said alkylene contains 1 to 20 carbon atoms and an alkyl radical of 4 to 20 carbon atoms.

Exemplary of the alkoxy groups that may be affixed to the phenyl group referred to above as R, are the branched and straight chain alkoxy groups, such as methoxy, ethoxy, propoxy, isopropoxy, butoxy, isobutoxy, pentoxy, hexoxy, and the like.

Typical of the alkyl radicals, referred to above, that may be used for the purpose of the instant invention are both the branched and the straight chain alkyl radicals. As examples of alkyls that may be used when alkyl radical contains from 1 to 20 carbon atoms, when the alkyl radical contains from 10 to 20 carbon atoms, or when the alkyl radical contains from 4 to 20 carbon atoms, are methyl, ethyl, n-propyl, n-butyl, n-amyl, n-hexyl, n-oxtyl, n-decyl, n-undecyl, dodecyl, tridecyl, pentadecyl, isopropyl, isobutyl, t-butyl, sec-butyl, iso-amyl, octadecyl, isohexyl, t-nonyl, and the like.

As examples of the alkylene chain, which may be a branched or straight chain alkylene, may be cited —(CH$_2$)$_n$— wherein $n$ is an integer of from 1 to 20, for example, —(CH$_2$)$_2$—, —(CH$_2$)$_3$—, —(CH$_2$)$_4$—, —(CH$_2$)$_5$—, —(CH$_2$)$_{10}$—

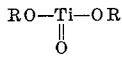

and the like.

The process for preparing the titanium oxide compounds of the instant invention consists essentially of deactivating two of the four substituents attached to the titanium atom of a tetra-loweralkoxytitanium compound to produce a mixed titanium compound with the following structure: $(R'O)_2Ti(OR)_2$. The deactivation is carried out by intimately reacting a tetra-loweralkoxytitanium, such as tetra-isopropoxy or tetra-n-butoxytitanium, with a stoichiometric amount of a member selected from the group consisting of long chain aliphatic or aromatic hydroxyl compounds. The ratio of the loweralkoxytitanium compound to the hydroxyl compound is generally 1 to 2. In the above-depicted structure formula, the R' group represents an aromatic, substituted aromatic, a long chain aliphatic or a substituted long chain aliphatic moiety that is less susceptible to hydrolytic cleavage than the originally present alkoxy group of the titanium compound. When the mixed titanium compound, $(R'O)_2Ti(OR)_2$, is hydrolyzed under controlled conditions, an oxy-titanium monomer, $(R'O)_2TiO$, is the resultant. The process for preparing a mixed titanium oxide, (R"O)(R'O)TiO may be indicated by the following equation wherein R' and R" are a member selected from the group consisting of long chain aliphatic or aromatic groups, and wherein said R' and R" are not the same:

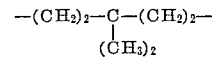
$(RO)_4Ti + R'OH \rightarrow (RO)_3Ti(OR')$

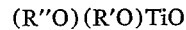
$(RO)_2Ti(OR')(OR")$

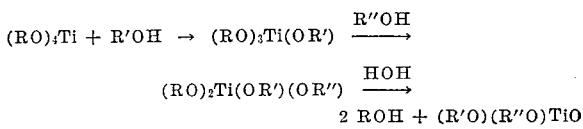
$2 ROH + (R'O)(R"O)TiO$

The process for making the titanium oxides, $(RO)_2TiO$ and the mixed titanium oxides (R'O)(R"O)TiO, of the instant invention is easily performed by dissolving a tetraloweralkoxytitanium in an inert solvent and adding thereto at room temperature, slowly, with constant stirring, a solution containing a long chain aliphatic alcohol or an aromatic hydroxyl compound. The alcohol is added in solution with an organic solvent therefor. For preparing $(RO)_2TiO$, two moles of the long chain aliphatic or aromatic hydroxyl compound are employed for one mole of the tetraloweralkoxytitanium. After the reaction has proceeded for about 30 minutes, two moles of the short chain alcohol formed are distilled off, and the reaction is cooled to room temperature. Next, an aqueous-alcoholic solution is added slowly with constant stirring. The ratio of the titanium compound to the added water is 1 to 1.

After a reaction period of about 30 minutes, two moles of a short chain alcohol are distilled off, along with other solvents, to finally give the titanium oxide $(RO)_2TiO$.

The process for making a mixed titanium oxide compound, $(R'O)(R''O)TiO$, is similar to the above-described techniques. To tetra-loweralkoxytitanium dissolved in an inert solvent is added slowly and with constant stirring an organic solution containing a long chain aliphatic alcohol or an aromatic hydroxyl compound. The organic solvent for the alcohol is freely miscible with the inert solvent used for the tetra-alkoxytitanium compounds; one mole of the long chain aliphatic or aromatic alcohol is used for one mole of the tetra-loweralkoxytitanium. After an initial reaction period of about 30 minutes, one mole of the short chain aliphatic alcohol formed is removed by distillation and the reaction is permitted to cool to room temperature.

To the reaction flask is then slowly added with constant stirring one mole of a different long chain alcohol or aromatic hydroxyl compound. After a similar 30 minute reaction period, one mole of the short chain alcohol is removed by distillation. To the flask is now added at room temperature an aqueous alcohol solution wherein the ratio of the mixed titanium compound, $(RO)_2Ti(OR')(OR'')$ to the water is 1 to 1, to hydrolyze the mixed titanium compound and thereby produce the desired heterogeneous oxide $(R'O)(R''O)TiO$. The excess solvents and alcohols are distilled over under vacuum. The residual oxide is finally heated on an oil bath, under vacuum to remove unreacted organic compounds and to dry the final product.

The long chain aliphatic alcohols that may be used in the present invention include aliphatic alcohols of from twelve to twenty carbon atoms. Exemplary of long chain aliphatic radicals to which the hydroxyl group is affixed are: n-dodecyl, n-tridecyl, n-tetradecyl, n-pentadecyl, n-hexadecyl, n-heptadecyl, n-octadecyl, n-nonyldecyl and the like.

The hydroxyl compounds that may be used for the process of the invention may be depicted by the general formula R—OH and include hydroxyl compounds such as aryl hydroxyl, substituted aryl hydroxyl and silanols. The instant R represents groups such as phenyl, substituted phenyl, phenylalkylene and the like. As examples of aryl hydroxyl compounds may be mentioned phenol, p-halophenol, naphthol and the like. The substituted aryl hydroxyl compounds include alkylphenols, wherein the alkyl group contains from 1 to 20 carbon atoms. Examples of alkylphenols are o-methylphenol, p-methylphenol, p-dodecylphenol, p-tetradecylphenol, p-isopropylphenol and the like. The substituted aromatic aryl hydroxyl compounds also include alkoxyphenols such as p-methoxyphenol, p-ethoxyphenol, p-propoxyphenol, p-isopropoxyphenol and the like. The silanols include the trialkylsilanols wherein the alkyl group contains from 4 to 20 carbon atoms, such as trihexylsilanol, tridodecylsilanol, trioctylsilanol, mixed silanols like dialkyl-phenylsilanol, dialkylbenzysilanol, silanols like phenylalkylenesilanol such as tribenzylsilanol, triphenylpropylene silanol and the like.

The solvents that can be used for the process of this invention include aliphatic hydrocarbons, cycloaliphatic hydrocarbons, aromatic hydrocarbons, halogenated hydrocarbons, and alcohols identical to those attached to the starting tetraloweralkoxytitanium compounds and the like. Examples of suitable diluents include xylene, benzene, toluene, n-heptane, cyclohexane, isopropyl alcohol and the like.

The organic titanium oxide compounds of the present invention are useful as coating agents. The instant titanium oxides may be used to coat glass surfaces to impart lubricity and scratch resistance thereto. The silicon derivatives of these titanium oxides are the now preferred members as glass coating agents. The titanium oxides may also be used for coating paper and paperboard articles of commerce to lessen the possibility of scuffs and quills. The bis(p-fluorophenoxy)titanium oxides were found to be useful as a cocatalyst for polymerizing ethylene in a Ziegler type polymerization reaction.

The instant titanium compounds, $(RO)_2TiO$ and $(R'O)(R''O)$—TiO, were shown to be monomeric in dilute solution by molecular weight studies. The molecular weight determinations were carried out at 37° C. using a Mechrolab vapor pressure osmometer Model 302.

The following specific examples will serve to illustrate the nature of the invention and are not intended as limitations upon its scope. In the examples below, "g." means grams, "m." means mole, "ml." indicates milliliters, and "mm." indicates millimeters.

EXAMPLE 1

To freshly distilled tetraisopropoxytitanium (28.4 g., 0.1 m.) in m-xylene (120 ml.) was added slowly and with constant stirring, at room temperature, freshly distilled phenol (18.8 g., 0.2 m.) in m-xylene (60 ml.). A stoichiometric amount of isopropyl alcohol (0.2 m.) was distilled over by fractional distillation. The residual red colored solution was cooled to room temperature and water (1.8 g., 0.1 m.) in isopropyl alcohol (50 ml.) was slowly added and with rapid stirring. After about twenty minutes of stirring, the solvents were distilled over under vacuum (1–2 mm.) leaving an orange solid. This residual solid was heated on an oil bath (80–90° C.) under vacuum (0.5 mm.) for two hours to remove any unreacted phenol. The diphenoxytitanium oxide, $(C_6H_5O)_2TiO$, produced, melted at 198–199° C. The analytical results for $C_{12}H_{10}O_3Ti$ are: Calculated, C, 57.7; H, 4.01; Ti, 19.14. Found, C, 57.9; H, 4.67; Ti, 19.4. Molecular weight in $CH_2Cl_2$ 278, calculated 250.

EXAMPLE 2

Following the procedure of Example 1, tetradecanol (21.4 g., 0.1 m.) was added to tetra-n-butoxytitanium (17.0 g., 0.05 m.). After a stoichiometric amount of butyl alcohol was collected, the residual solvent was removed by distilling vacuum (0.5 mm.) yielding a pale yellow viscous liquid which was further heated from an oil bath (130°) for two hours in a vacuum (0.5 mm.). The analytical results for the di-n-butoxy-bis-(tetradecanoxy)titanium, $(C_{14}H_{29}O)_2Ti(OC_4H_9)_2$, $C_{36}H_{76}O_4Ti$ are: C, 69.6; H, 12.1; Ti, 7.74. Found, C, 69.5; H, 11.3; Ti, 7.30.

The di-n-butoxy-bis(tetradecanoxy)titanium prepared above was hydrolyzed as indicated in Example 1. A clear, pale yellow liquid was isolated which turned to a white, waxy solid on standing for a short time. The resulting bis(tetradecanoxy)titanium oxide $(C_{14}H_{29}O)_2TiO$, $$C_{28}H_{58}O_3Ti$$

had an elemental analysis of C, 70.1; H, 11.9; Ti, 9.5. The calculated values are: C, 69.7; H, 11.8; Ti, 9.7. Molecular weight in $CCl_4$ 531; calculated 490.

EXAMPLE 3

The compound, bis(diethylphenylsiloxy)titanium oxide,

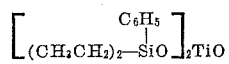

was prepared by reacting tetraisopropoxytitanium (14.2 g., 0.05 m.) and diethylphenylsilanol (18.0 g., 0.1 m.) and hydrolyzing as indicated previously. The final product was a clear, viscous yellow liquid which decomposes on vacuum distillation (035 mm). Analysis calculated for $C_{20}H_{30}O_3Si_2Ti$: C, 57.0; H, 7.14; Ti, 11.38. Found: C, 56.6; H, 7.23; Ti, 11.0. Molecular weight in $CH_2Cl_2$ 518; calculated 422.

EXAMPLE 4

Bis(tribenzylsiloxy)titanium oxide, $$[(C_6H_5CH_2)_3SiO]_2TiO$$

was prepared from tetraisopropoxytitanium (14.2 g., 0.05 m.) and tribenzylsilanol, by following the reacting and hydrolyzing procedures indicated previously. A lime colored liquid was isolated which converted to a lime colored solid on standing a short time. Calculated for $C_{42}H_{42}O_3Si_2Ti$: C, 72.1; H, 6.03; Si, 8.01; Ti, 6.88. Found: C, 71.3; H, 6.21, Si, 7.57; Ti, 6.85. Molecular weight in $C_6H_6$ 813; calculated 698.

EXAMPLE 5

Following the reaction and hydrolysis techniques of Example 1, bis(trihexylsiloxy)titanium oxide, $$[(C_6H_{13})_3SiO]_2TiO$$

was prepared from tetraisopropoxytitanium (7.1 g., 0.025 m.) and trihexylsilanol (20 g., 0.05 m.). Calculated for $C_{36}H_{78}O_3Si_2Ti$: C, 65.3; H, 11.81; Si, 8.46; Ti, 7.26. Found: C, 65.3; H, 12.22; Si, 7.87; Ti, 7.13. Molecular weight in $C_6H_6$ 1055; calculated 662.

EXAMPLE 6

Bis(triethylsiloxy)titanium oxide $[(C_2H_5)_3SiO]_2TiO$ was prepared from tetraisopropoxytitanium (14.2 g., 0.05 m.) and triethylsilanol (13.2 g., 0.1 m.). The experimental techniques were as indicated previously. Calculated for $C_{12}H_{30}O_3Si_2Ti$: C, 44.3; H, 9.20; Si, 17.15; Ti, 14.70. Found: C, 45.0; H, 9.32; Si, 14.60; Ti, 13.44. Molecular weight in $CH_2Cl_2$ 659; calculated 326.

EXAMPLE 7

Bis(dodecylphenoxy)titanium oxide, $$(C_{12}H_{25}-C_6H_4O)_2TiO$$

was prepared as follows: dodecylphenol (52.4 g., 0.2 m.) was added slowly and with stirring to tetraisopropoxytitanium (28.4 g., 0.1 m.). A stoichiometric quantity (0.2 m) of iso-propyl alcohol was distilled over under atmospheric pressure.

To the di - dodecylphenoxy-di-isopropoxytitanium prepared above was added at room temperature and with stirring, water (1.8 g., 0.1 m.) in isopropyl alcohol (50 ml.). The solution was refluxed for 30 minutes, then the solvents were removed under vacuum (1 mm.) leaving a red, non-crystalline solid which was dried in vacuum (0.5 mm., 70° C.) over night. Calculated for:

$$C_{36}H_{58}O_3Ti$$

C, 73.7; H, 9.9; Ti, 8.2. Found: C, 73.7; H, 10.1; Ti, 8.1. Molecular weight in $C_6H_6$ 594; calculated 586.

EXAMPLE 8

Tetraisopropoxytitanium (14.2 g., 0.05 m.) and o-cresol (10.8 g., 0.1 m.) were reacted and hydrolyzed as indicated in Example 1. Calculated for the resultant bis(o-methylphenoxy)titanium oxide, $(O-CH_3-C_6H_4O)_2TiO$, $C_{14}H_{14}O_3Ti$, C, 60.3; H, 5.05; Ti, 17.2. Found: C, 59.4; H, 5.43; Ti, 17.0. Molecular weight in $CCl_4$ 296, calculated 278.

EXAMPLE 9

Following the procedure indicated in Example 1, bis(p-chlorophenoxy)titanium oxide $(p-ClC_6H_4O)_2TiO$, was prepared from the reactants tetraisopropoxytitanium (14.2 g., 0.05 m.) and p-chlorophenol (12.8 g., 0.1 m.). A red solid was isolated and purified by washing in warm n-heptane. The insoluble products were removed by filtration, followed by drying in a vacuum oven. Calculated for $C_{12}H_8Cl_2O_3Ti$: C, 45.3; H, 2.51; Ti, 15.0; Cl, 22.2. Found: C, 45.4; H, 3.1; Ti, 14.7; Cl, 19.9. Molecular weight in $C_6H_6$ 381; calculated 319.

EXAMPLE 10 o - Methylphenoxy-p-dodecylphenoxy - titanium oxide, $(o-CH_3C_6H_4O)(p-C_{12}H_{25}C_6H_4O)TiO$, was prepared as follows: to tetraisopropoxytitanium (28.4 g., 0.1 m.) in m-xylene (120 ml.) was added slowly and with stirring p-dodecylphenol (26.6 g., 0.1 m.). Isopropyl alcohol (0.1 m.) was removed by vacuum distillation. Next, the vacuum was discontinued and o-methylphenol (10.8 g., 0.1 m.) in m-xylene (50 ml.) was added slowly and with stirring to the clear red solution. At the end of this addition, vacuum was again applied to distill off another one-tenth mole of isopropylalcohol. Then, water (1.8 g., 0.1 m.) in isopropyl alcohol (50 ml.) was added, slowly and with stirring. The final solution was distilled under vacuum to remove all solvents and the red-orange glassy solid was dried in vacuum. Calculated for $C_{25}H_{36}O_3Ti$: C, 69.7; H, 8.36; Ti, 11.1. Found: C, 69.6; H, 8.9; Ti, 11.2. Molecular weight in $C_6H_6$ 514; calculated 432.

EXAMPLE 11

Following the procedure of Example 1, bis(alphanaphthoxy)titanium oxide was prepared from tetraisopropoxytitanium (14.2 g., 0.05 m.) and alpha-naphthol (14.4 g., 0.1 m.). The fiinal product from the hydrolysis was a brown solid melting at 122–4° C., after drying in a vacuum over night. Calculated for $C_{20}H_{14}O_3Ti$: C, 68.6; H, 4.1; Ti, 13.6. Found: C, 68.5; H, 4.74; Ti, 13.4. Molecular weight in $C_6H_6$ 332; calculated 349.

EXAMPLE 12

Following the procedure of Example 1, bis(p-fluorophenoxy)titanium oxide, $(p-FC_6H_4O)_2TiO$, was prepared from tetraispropoxytitainum (14.2 g., 0.05 m.) and p-fluorophenol (11.2 g., 0.1 m.). A red solid was isolated after removal of the solvents and it was vacuum dried. Calculated for $C_{12}H_8F_2O_3Ti$: C, 50.3; H, 2.8; Ti, 16.7. Found: C, 49.8; H, 3.04; Ti, 17.08. Molecular weight in $CH_2Cl_2$ 367; calculated 286.

EXAMPLE 13

The compound bis(p-methoxyphenoxy)titanium oxide $(CH_3OC_6H_4O)_2TiO$, was prepared by following the procedure indicated previously from tetraisopropoxytitanium (14.2 g., 0.05 m) and p-methoxy (12.4 g., 0.1 m.). Calculated for $C_{14}H_{14}O_5Ti$: C, 54.2; H, 4.5; Ti, 15.4. Found: C, 53.4; H, 4.6; Ti, 15.4. Molecular weight in $C_6H_6$; calculated 310.

While this invention has been described and illustrated by the examples shown, it is not intended to be strictly limited thereto, as other modifications and variations may be employed within the scope of the disclosure and within the scope of the claims.

What is claimed is:

1. A compound of the formula:

$$\text{RO}-\underset{\underset{\text{O}}{\|}}{\text{Ti}}-\text{OR}$$

wherein R represents a member of the group consisting of:
  alkyl of from 10 to 20 carbon atoms,
  alkylphenyl wherein said alkyl group is from 1 to 20 carbon atoms,
  alkoxyphenyl wherein said alkoxy is from 1 to 8 carbon atoms,
  a halophenyl, and
  a group $-Si(R_1)_3$ wherein $R_1$ is a benzyl radical.

2. A compound as defined in claim 1 in which the R radicals are different.

3. Bis(tetradecanoxy)titanium oxide.
4. Bis(dodecylphenoxy)titanium oxide.
5. Bis(o-methylphenoxy)titanium oxide.
6. Bis (p-chlorophenoxy)titanium oxide.
7. o-Methylphenoxy-p-dodecylphenoxytitanium oxide.
8. Bis(p-fluorophenoxy)titanium oxide.
9. Bis(p-methoxyphenoxy)titanium oxide.
10. Bis(diethylphenylsiloxy)titanium oxide.
11. Bis(tribenzylsiloxy)titanium oxide.

(References on following page)

References Cited

UNITED STATES PATENTS

| | | | |
|---|---|---|---|
| 3,013,993 | 12/1961 | Rust et al. | 260—429.5 XR |
| 3,046,267 | 7/1962 | Cohen | 260—429.5 XR |
| 3,306,918 | 2/1967 | Schenck | 260—429.5 |

OTHER REFERENCES

Chemical Abstracts, vol. 48, p. 9254 (1954).
Chemical Abstracts, vol. 55, p. 23312.
Chemical Reviews, vol. 61, pp. 8, 11, 13, 19 and 20.
Feld & Cowe, The Organic Chem. of Titanium (1965), Butterworth & Co., Washington, D.C., p. 146.

TOBIAS E. LEVOW, *Primary Examiner.*

H. M. S. SNEED, *Assistant Examiner.*

U.S. Cl. X.R.

252—431; 117—124, 154; 260—448.2